United States Patent
Jackson et al.

(10) Patent No.: US 9,407,354 B2
(45) Date of Patent: Aug. 2, 2016

(54) OUTDOOR DIGITAL MODULATOR SYSTEM FOR USE WITH A LINEAR RADIO, AND A METHOD THEREOF

(71) Applicant: Hughes Network Systems, LLC, Germantown, MD (US)

(72) Inventors: Thomas Jackson, Monrovia, MD (US); George Eapen, Boyds, MD (US); Paul Lacasse, New Market, MD (US)

(73) Assignee: Hughes Network Systems, L.L.C., Germantown, MD (US)

( * ) Notice: Subject to any disclaimer, the term of this patent is extended or adjusted under 35 U.S.C. 154(b) by 0 days.

(21) Appl. No.: 14/588,124

(22) Filed: Dec. 31, 2014

(65) Prior Publication Data

US 2016/0191149 A1 Jun. 30, 2016

(51) Int. Cl.
| | |
|---|---|
| H04B 3/36 | (2006.01) |
| H04B 1/38 | (2015.01) |
| H04L 25/20 | (2006.01) |
| H04B 7/185 | (2006.01) |
| H04L 7/033 | (2006.01) |

(52) U.S. Cl.
CPC ........ *H04B 7/18528* (2013.01); *H04B 7/18517* (2013.01); *H04B 7/18582* (2013.01); *H04L 7/0331* (2013.01)

(58) Field of Classification Search
USPC ................ 375/219, 220, 221, 222, 257, 259, 375/240.26–240.29, 285, 295, 296, 316, 375/324, 347, 349, 354, 358, 362; 370/229, 370/230, 276, 293, 307, 297, 310, 334, 333, 370/332, 351, 360, 464, 503, 534, 532, 533, 370/536, 537, 542, 538
See application file for complete search history.

(56) References Cited

U.S. PATENT DOCUMENTS

| | | | |
|---|---|---|---|
| 5,578,972 A | 11/1996 | Hadden et al. | |
| 5,790,601 A | 8/1998 | Corrigan et al. | |
| 8,779,872 B2 | 7/2014 | Jackson et al. | |
| 9,288,009 B2 * | 3/2016 | Merlin | H04L 1/0015 |
| 2004/0229562 A1 | 11/2004 | Wren et al. | |
| 2008/0125051 A1 * | 5/2008 | Kim | H04B 7/0452 455/67.13 |
| 2011/0151777 A1 | 6/2011 | Kim et al. | |
| 2013/0022093 A1 * | 1/2013 | Zhang | H04L 1/0003 375/219 |
| 2013/0215763 A1 * | 8/2013 | Honda | H04L 1/0003 370/242 |

(Continued)

OTHER PUBLICATIONS

International Search Report for corresponding PCT Application No. PCT/US2015/067772 mailed Apr. 18, 2016.

*Primary Examiner* — Linda Wong
(74) *Attorney, Agent, or Firm* — Capitol City TechLaw; Jasbir Singh

(57) ABSTRACT

A communication system, an apparatus and a method for communicating with a radio disposed in an outdoor unit are provided. The apparatus including: a de-multiplexor configured to separate a multiplexed signal received on an inter-facility link (IFL) into a first signal; a demodulator configured to demodulate the first signal based-on a first modulator control information to obtain data; a modulator configured to modulate a portion of the data based-on a second modulator control information to generate a second signal; and an amplifier configured to amplify a transmission signal prior to transmission of the transmission signal with an antenna, wherein the transmission signal is based on the second signal, the second modulator control information is received by the de-multiplexor and the second modulator control information controls the modulation scheme used by the modulator.

23 Claims, 7 Drawing Sheets

(56) References Cited

U.S. PATENT DOCUMENTS

2013/0235919 A1\* 9/2013 Plevel ................ H04L 27/0014 375/226

2015/0010098 A1\* 1/2015 Kenney .................... H04L 1/00 375/267

2015/0358050 A1\* 12/2015 Lingam .................. H04B 3/542 375/257

\* cited by examiner

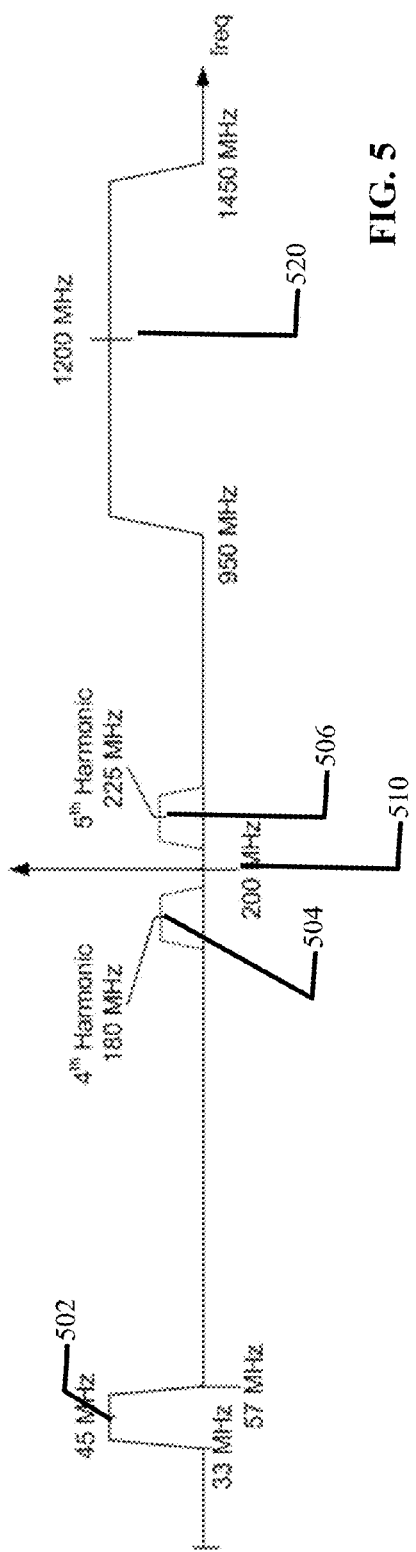
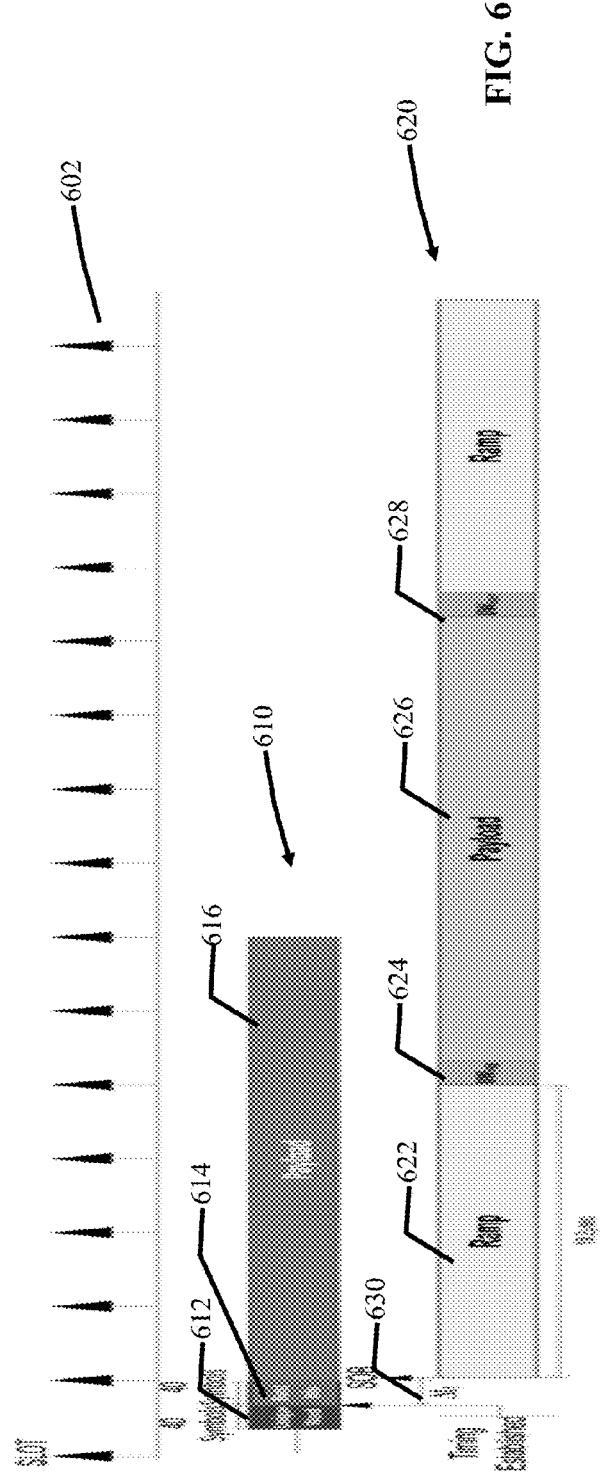

| ROW | | | | | | | |
|---|---|---|---|---|---|---|---|
| 0 | Frame Number [7:0] | | Burst_offset CommonSlot [23:0] | | | | |
| 1 | CB_size_slots [4:0] | - | N_ShortCB [2:0] | - | N_LongCB [2:0] | Symbol Rate [2:0] | Burst Code [3:0] | FEC Rate [3:0] | Pyld Mod Type [3:0] |
| | | | | | | | | | UW Mod Type [3:0] |
| 2 | Lastbyte_unused_bits [2:0] | - | Attenuation [9:0] | | | Payload_size_bytes [11:0] | | |
| 3 | TX Power [15:0] | | | | CPM H [15:0] / Reserve [15:10] → SCMA_Inter [9:0] | | | |
| 4 | Burst Size in CSlots [15:0] | | | | Encoded_payload_size_bits [15:0] | | | |
| 5 | Encoded_payload_w_pilot_size_symbols [15:0] | | | | [8:0] | Inv_sync_gain [6:0] | | |
| 6 | Not Used [31:0] | | | | | | | |
| 7 | Not Used [31:0] | | | | | | | |

FIG. 7

OUTDOOR DIGITAL MODULATOR SYSTEM FOR USE WITH A LINEAR RADIO, AND A METHOD THEREOF

FIELD OF THE INVENTION

The present disclosure relates to an outdoor modulator providing a communication link between electronics disposed indoors and electronics disposed outdoors for communicating between a terrestrial facility disposed indoors and a satellite, and more particularly, for avoiding issues related to equalizing a modulated signal over a cable providing the inter-facility link by communicating a modulated signal including a burst structure for controlling a modulator disposed in an outdoor unit.

BACKGROUND

Microwave communication systems (e.g., satellite based communications, etc.) are popular, especially where asymmetrical digital subscriber lines (ADSL) and cables are not available. By way of example, Fixed Service Satellite (FSS) systems have huge capacities with a relatively economical price structures, and the FSS systems provide various applications for subscribers, such as, telephony, fax, television, high speed data communication services, Internet access, satellite news gathering (SNG), digital audio broadcasting (DAB), etc.

In the prior art, an Inter-Facility Link (IFL) for satellite terminals in a Very Small Aperture Terminal (VSAT) application transmits data from an indoor unit to an outdoor unit using a data modulated L-band carrier and the outdoor unit up-converts or multiplies the data modulated L-band carrier to a higher frequency using a fixed constant, prior to transmission to the satellite. The integrity of the data modulated L-band carrier is affected by the cable length between the modem and the outdoor unit, and the integrity of the data modulated carrier transmitted over the IFL cable is not evaluated and/or corrected prior to transmission to the satellite. Moreover, there is no control communication between the in-door unit and the out-door unit as no processing is done by the ODU.

The transmitting of a signal from the IDU to the ODU requires extensive tuning of the IFL between the IDU and the ODU, for example, to equalize the signal for cable length of the signal from the IDU and ODU. In a transmit mode, the signals from the IDU to the ODU may have picked up extraneous signals ("noise"), unless the IFL connecting the IDU and the ODU are tuned. Without tuning the cable, the radio in the ODU amplifies/boosts the signal to be transmitted along with amplifying the noise signals and up-converts the frequencies of the signals to be transmitted into higher frequencies. The tuning of the IFL incurs installation costs.

In addition, for linear radio transmissions, the reception and transmission frequency bands overlap and the prior art IFL requires two cables, one cable for receiving and one cable for sending, and each cable may need to be separately tuned. Lastly, in the prior art, radio components are dispersed between the IDU and ODU, rather being disposed entirely, for example, in the ODU.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An apparatus for communicating with a radio disposed in an outdoor unit is provided. The apparatus including: a de-multiplexor configured to separate a multiplexed signal received on an inter-facility link (IFL) into a first signal; a demodulator configured to demodulate the first signal based-on a first modulator control information to obtain data; a modulator configured to modulate a portion of the data based-on a second modulator control information to generate a second signal; and an amplifier configured to amplify a transmission signal prior to transmission of the transmission signal with an antenna, wherein the transmission signal is based on the second signal, the second modulator control information is received by the de-multiplexor and the second modulator control information controls the modulation scheme used by the modulator.

A communication system is provided. The system includes: an In-Door Unit (IDU) modulator configured to generate a first signal at a first carrier frequency by modulating data based-on a first modulator control information; a multiplexor configured to generate a multiplexed signal including the first signal; an Inter-Facility Link (IFL) to communicate the multiplexed signal; and a remote apparatus configured to receive the multiplexed signal via the IFL. The remote apparatus includes: a de-multiplexor configured to separate the first signal from the multiplexed signal, a demodulator configured to demodulate the first signal based-on the first modulator control information to obtain data, a modulator configured to modulate a portion of the data based-on a second modulator control information to generate a second signal, and an amplifier configured to amplify a transmission signal prior to transmission of the transmission signal with an antenna, wherein the transmission signal is based on the second signal, the second modulator control information is received by the de-multiplexor and the second modulator control information controls the modulation scheme used by the modulator.

A method for communicating data over an inter-facility link (IFL) between an indoor unit (IDU) and a radio disposed in an outdoor unit (ODU) is provided. The method including: establishing a first modulator control information; establishing a second modulator control information; modulating, with an IDU modulator, the data including the second modulator control information based-on the first modulator control information to generate a first signal; receiving the first signal from the IDU at the ODU with the IFL; demodulating the first signal in the ODU to obtain the data; retrieving the second modulator control information; configuring an ODU modulator using the second modulator control information; modulating, with the ODU modulator, a portion of the data to generate a second signal based-on the second modulator control information; and transmitting a third signal based-on the second signal.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 5 illustrates an exemplary frequency distribution of signals used by a communication system and concurrently placed on an inter-facilities link according to various embodiments.

FIG. 6 illustrates a first exemplary signal structure or burst format for transmitting data or information from the IDU to the ODU, and a second exemplary signal structure or burst format for transmitting data or information from the ODU to the satellite, according to various embodiments.

FIG. 7 illustrates an exemplary modulator control information or burst packet header according to various embodiments.

DETAILED DESCRIPTION

Figure 1:
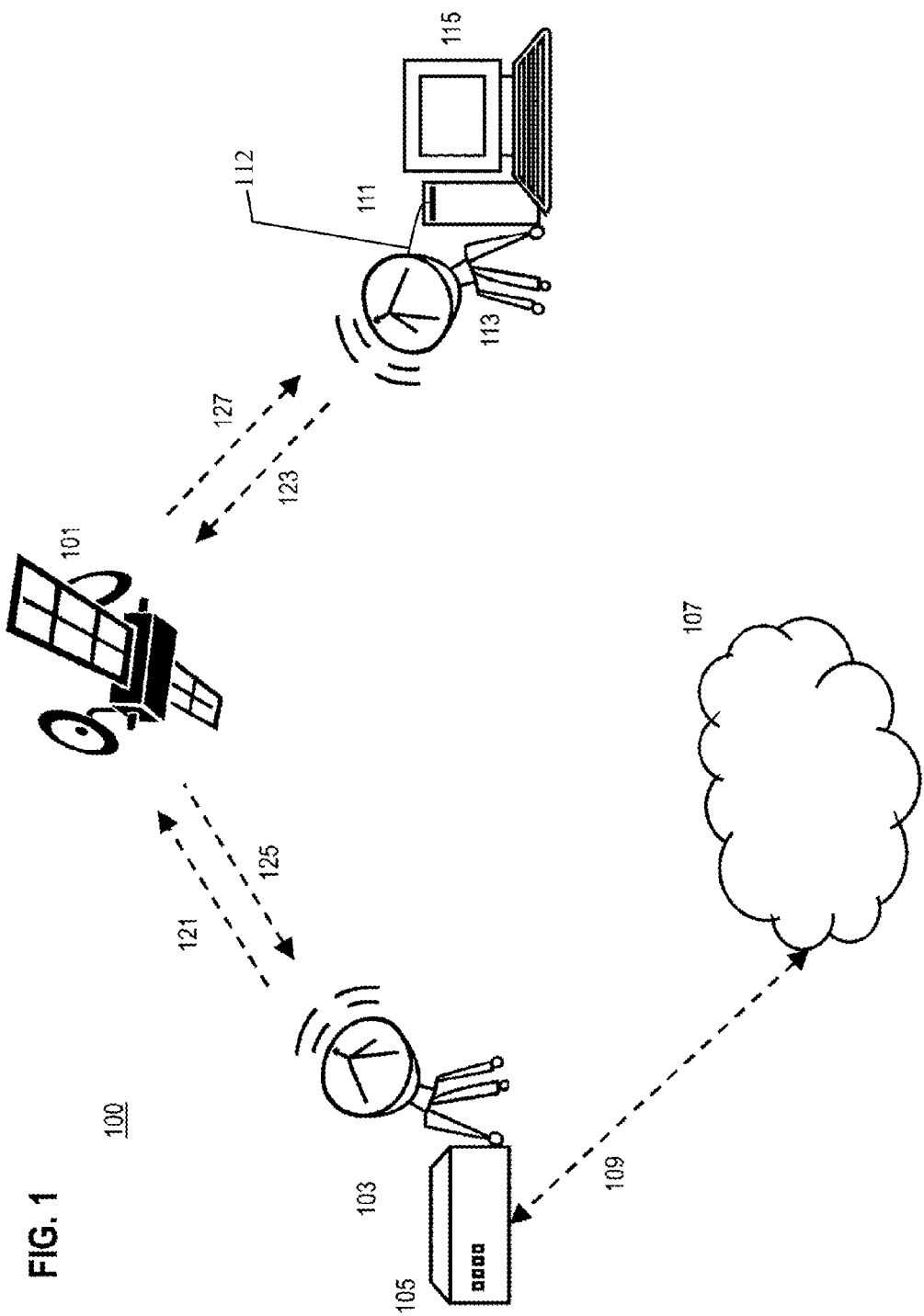
FIG. 1 illustrates a microwave communication system according to various embodiments.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Overview

A system, method, and apparatus for how to avoid losses attributable to an Inter-Facility Link (IFL) connecting an In-Door Unit (IDU) and an Out-Door Unit (ODU), where the IFL is used to transmit a data modulated signal is described. In exemplary embodiments, the IFL may be a single cable. In exemplary embodiments, the IFL is used to convey data that is to be transmitted as a linear radio communication to the satellite, while concurrently being used to convey transmissions received from the satellite.

In particular, the disclosure teaches how to avoid losses attributable to the power control mechanisms associated with the IFL. The disclosure permits the satellite transmission modulator to be disposed closer to the outdoor electronics without moving an entire modulator-demodulator (modem) to outdoors. In the following description, for the purposes of explanation, numerous specific details are set forth in order to provide a thorough understanding of the embodiments of the disclosure. It is apparent, however, to one skilled in the art that the embodiments of the disclosure may be practiced without these specific details or with an equivalent arrangement. In other instances, well-known structures and devices are shown in block diagram form in order to avoid unnecessarily obscuring the embodiments of the disclosure.

There are over three hundred communications satellites in the geostationary orbit. Subscribers may use a fixed pointing very small aperture terminal (VSAT) to communicate with the communications satellites.

FIG. 1 illustrates a microwave communication system according to various embodiments. The system 100 may include at least one satellite 101 and at least one center hub 103 connected via a server or base station 105 to a network 107. The connection 109 between the server and base station 105 to the network 107 may be wired, wireless, or a combination thereof. The network 107 includes one or more wired/data networks (for example, LAN, MAN, WAN, the internet, and the like.) and one or more wireless networks (for example, TDMA, GSM, CDMA, GPRS, EDGE, MBMS, DVB, CSD, HSCSD, and the like.).

The system 100 may include a subscriber system 111. The subscriber system 111 may include an IFL 112 connecting at least one remote ground terminal (e.g., VAST) 113 and a subscriber terminal 115. The subscribers may be individuals, business entities, governmental agencies, or the like. The subscriber terminal 115 may include access points configured to communicate with other subscriber terminals in the network 107 using, for example, radio frequency (RF), Bluetooth (BT), infrared (IrDA) or any of a number of different wireless networking techniques, including WLAN techniques. The subscriber terminal 115 may be disposed indoors, while the at least one remote ground terminal 113 including a radio may be disposed outdoors.

The remote ground terminal 113 may be utilized at a location for communicating via the satellite 101 to the central hub 103. The central hub 103 communicates with multiple remote ground terminals, and has a significantly larger antenna, as well as a significantly larger power output capability than any of the remote ground terminals. The communication satellite 101 receives uplink signals 121 from the central hub 103 and uplink signals 123 from the remote ground based terminal 103. The communication satellite 101 transmits downlink signals 125 to the central hub 103 and downlink signals 127 to the ground based terminal 113. The communication satellite 101 preferably receives signals at a first frequency and transmits signals at a second frequency different from the first frequency.

A very small aperture terminal (VSAT) is a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites.

VSATs may be used to transmit narrowband data (point of sale transactions, such as, credit card, polling or RFID data; or SCADA), or broadband data (for the provision of Satellite Internet access to remote locations, VoIP or video). VSATs may be also used for transportable, on-the-move (utilizing phased array antennas) or mobile maritime communications. Very small aperture terminal (VSAT) remote terminals may be used to communicate data, voice and video, to or from a remote site or location with the central hub 103. The center hub 103 provides a hub terminal including an outdoor transceiver and antenna, indoor integrated modem and multiplexing systems, a single-cable inter-facility link, and a variety of network interfaces that may simultaneously deliver traffic to a network backbone, for example, in TDM, ATM, and IP formats. Sectors may be provisioned for 1:N (e.g., N=4) active redundancy.

A VSAT may operate in frequency bands such as C band (4-6 GHz), Ku band (11-14 GHz), and Ka band (26.5-40 GHz). C band is ideal for heavy rain locations. Ku band is the most popular with dish sizes in the range 60 cm-1.8 m diameter. The Ka band satellite broadband services are rapidly expending.

Ku band is primarily used for satellite communications. Ku band satellites are also used for backhauls and particularly for satellite from remote locations back to a television network's studio for editing and broadcasting. The band is split into multiple segments that vary by geographical region by the International Telecommunication Union (ITU). Ku band systems require smaller dishes than C band because of their shorter wavelengths, (higher frequencies), which combined with higher satellite transponder power, translates into smaller, cheaper antennas on the ground and therefore lower start up and transport costs. As the power increases, the dish's size may decrease. The smaller Ku Band dishes may be easily installed on almost any surface, for example, the ground, roofs or bolted to the side of buildings. This is an important consideration for areas with limited space. Compared with C-band, Ku band is not similarly restricted in power to avoid interference with terrestrial microwave systems, and the power of its uplinks and downlinks may be increased. The satellite operator's earth station antenna requires more accurate position control when operating at Ku band than compared to C band.

New VSAT systems using Ka band technology promise higher bandwidth rates for lower costs. Ka band dishes are smaller than Ku band dishes because of the even shorter wavelengths (higher Ka band frequencies) and higher satellite power. The higher frequencies of Ka band are significantly more vulnerable to signal quality problems caused by rainfall. Therefore, Ka band VSATs are usually unsuitable for mission critical or high availability systems in the tropical and sub-tropical regions without the provision of measures to combat adverse weather conditions.

A VSAT remote terminal has a small aperture directional antenna for receiving from and transmitting signals to a satellite, and a feed assembly, attached to the dish. This feed assembly is connected via a single cable referred to as an inter-facility link (IFL) to an indoor unit (IDU) that processes the information (voice, video or data) received or for transmission, and an outdoor unit (ODU) mounted on or near the antenna for transmitting a modulated carrier generated by the IDU to the antenna. A feed assembly is placed at the focal point and includes a feed horn, a radio, etc. A feedhorn (or feed horn) is a horn antenna used to convey radio waves between the radio and the dish. The IDU demodulates incoming signals received from the ODU and also operates as an interface between a user's communication equipment and the ODU. Details of VSAT terminals are further provided in U.S. Pat. No. 5,578,972 to Hadden et al. and U.S. Pat. No. 8,779,872, which are incorporated herein by reference in their entireties.

Colloquial names for exemplary frequency bands as used in satellite communications are detailed in the following table.

| EARTH STATION FREQUENCIES | |
| --- | --- |
| BAND | FREQUENCY |
| IF | 70-150 MHz |
| L | 800-2150 MHz |

| SATELLITE FREQUENCIES (GHz) | | |
| --- | --- | --- |
| BAND | DOWNLINK | UPLINK |
| C | 3.700-4.200 | 5.925-6.425 |
| X (Military) | 7.250-7.745 | 7.900-8.395 |
| Ku (Europe) | Fixed Satellite Service (FSS): 10.700-11.700 | FSS & Telecom: 14.000-14.800 |
| | Direct Broadcast Satellite (DBS): 11.700-12.500 | DBS: 17.300-18.100 |
| | Telecom: 12.500-12.750 | |
| Ku (America) | FSS: 11.700-12.200 | FSS: 14.000-14.500 |
| | DBS: 12.200-12.700 | DBS: 17.300-17.800 |
| Ka | ~18-~31 GHz | |
| EHF | 30-300 | |
| V | 36-51.4 | |

In exemplary embodiments, an In-Door Unit (IDU) is disposed in a climate-controlled environment about 300 feet, about 400 feet, about 500 feet, about 1000 feet or the like apart from the Out-Door Unit (ODU). By using a digital Inter-Facility Link (IFL) more computing ability may be disposed in the ODU (radio) and the same cable may be used to signal, communicate, supply DC power, and the like between the IDU and the ODU.

The digital IFL allows processing of the transmission signal in the ODU. Using a low-frequency modulated carrier to communicate between the IDU and ODU, a single cable may be used for receiving and sending information. In exemplary embodiments, a low frequency carrier, for example, a 45 MHz carrier, is modulated with information to be transmitted. The ODU demodulates the low-frequency modulated signal from the IDU. The demodulated information is than modulated with a higher frequency carrier, for example, a 2 GHz frequency carrier, for transmission. Thus, a system using a modulator-IFL-digital demodulator-modulator (M-IFL-DM-M), in order, is used to make the ODU radio independent of the IDU unit. This allows all radio components to be disposed in the ODU. In exemplary embodiments, the M-IFL-DM-M provides for disposing the first modulator in the IDU, the demodulator and the second modulator in the ODU, with the IDU and the ODU connected by the IFL. As such, the climate sensitive equipment associated with a high thermal dispersion, for example, a server communicating with a modem, may be disposed in a controlled environment, and radio equipment may be disposed in an ODU that is disposed close to the IDU.

In exemplary embodiments, information to be communicated from the terrestrial facility to the satellite is, modulated at a first carrier frequency into a first signal at an IDU, the first signal is transmitted over a IFL to an ODU, demodulated at the ODU, modulated at a second carrier frequency at the ODU, amplified, up-converted and transmitted at the second frequency via an antenna to the satellite. In exemplary embodiments, information is fed into a modulator at the IDU, which mixes the information with a carrier signal at a first frequency, through a process called modulation. The modulator then outputs the modulated signal to the ODU. Electronics at the ODU may include a demodulator to demodulate the modulated signal to retrieve the information, a modulator to modulate the information at a second frequency (for example, at a frequency greater than the first frequency), an amplifier to amplify the re-modulated signal, and an up-convertor to increase the frequency of the re-modulated signal to a satellite transmission signal frequency and feeds it to the feed horn. The feed horn then disperses the signal onto the dish, which reflects the satellite transmission signal, in a focused beam towards the satellite. The modulation within the IDU coupled with the subsequent demodulation in the ODU provides error correction over the cable and thus reduces transmission errors.

In some embodiments, DC power is provided through the IFL with the modulated signal from the IDU to the ODU. In exemplary embodiments, an oscillator frequency for stabilizing and multiplying the modulated data signal to the satellite is transmitted via the cable from the IDU to the ODU. The stabilization of the oscillator frequency may use a phase lock loop (PLL).

In a receive mode, the ODU processes satellite reception signals and outputs useable information, data, video or voice, which may be passed on to the appropriate device connected to the IDU. For example, if the VSAT system is used for internet access, a router, network switch or computer could be connected to the receiver circuit. The ODU may down convert the satellite reception frequencies to the IDU prior to transmission to the IDU. In exemplary embodiments, the ODU down converts the satellite reception signal from the satellite, such that the down-converted signal does not overlap with signals being the modulated transmission signals from the IDU to the ODU. When the satellite transmission frequencies from the satellite are conveyed without down conversion, they require the use of wave guides for conveyance.

Other coupling apparatus heretofore utilized contained various combinations of individual components, including multiple filters and transducers, coupled together as required to perform the necessary task of separating the signals to be transmitted from the received signals. The components are used either as individual devices, or as a stand-alone module of assembly of these devices.

Figure 2:
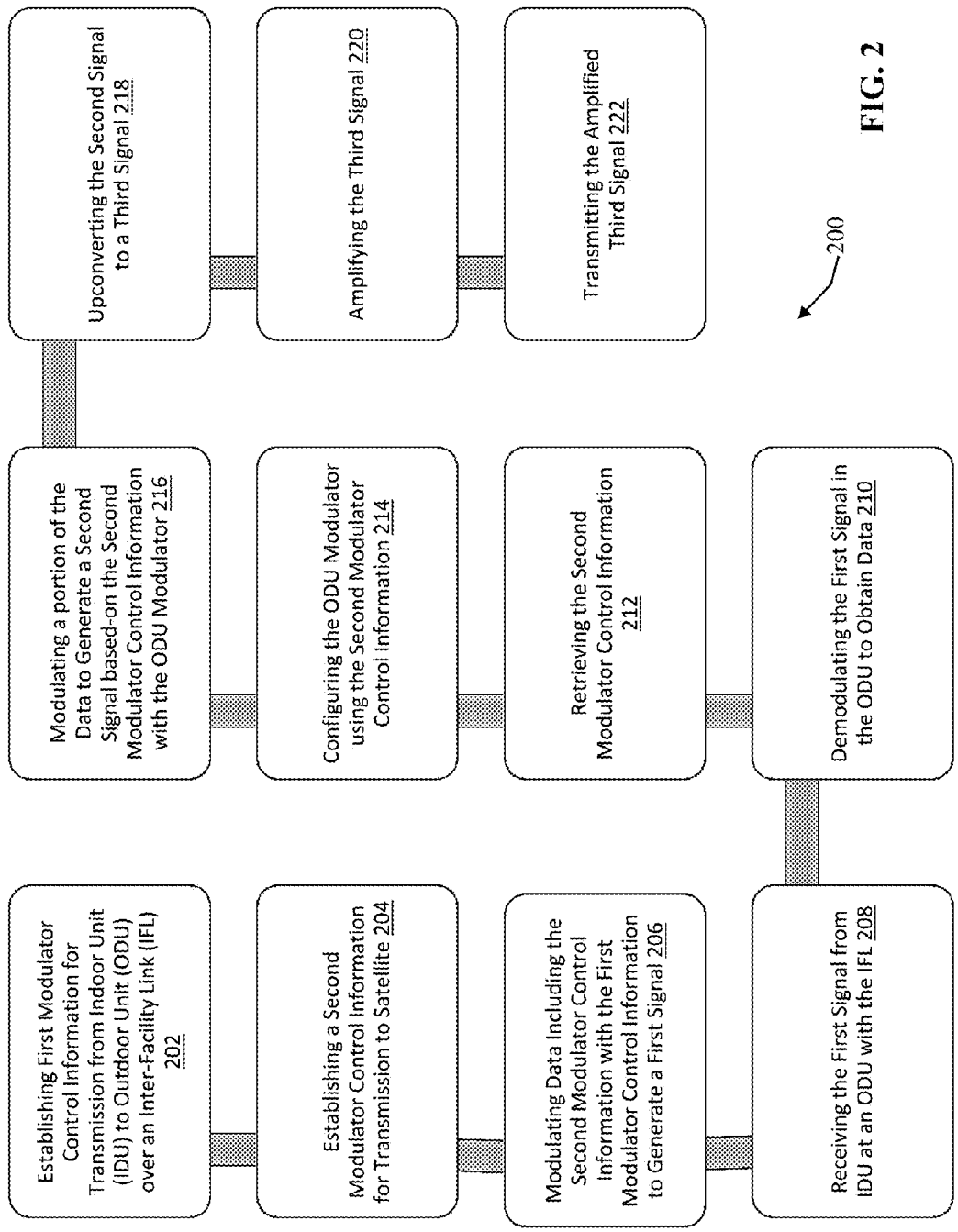
FIG. 2 is a flowchart of an exemplary method that may be implemented in an embodiment of the invention.

FIG. 2 is a flowchart of an exemplary method that may be implemented in an embodiment of the invention.

A method 200 may include operation 202 for establishing first modulator control information for transmission from an IDU to an ODU over an IFL. In exemplary embodiments, the first modulator control information may include burst information. In exemplary embodiments, the first modulator control information may be fixed as a single modulation scheme and symbol rate, for example, a 16 APSK scheme at 24 Mega Symbols per Second (Msps) modulated using a first frequency carrier. In exemplary embodiments, first modulator control information may set select the first frequency carrier as a low frequency carrier, for example, a 45 MHz carrier signal. In exemplary embodiments, the first modulator control information may include control information for radio components, such as, an amplifier, an up converter, a BIAS control and the like.

The method 200 may include operation 204 for establishing second modulator control information for transmission to satellite. In exemplary embodiments, the second modulator control information may include burst information, for example, as illustrated in FIG. 7. For example, operation 204 may set the second modulator control information to select a modulation scheme selected from OQPSK, 8 PSK, 16 APSK, or the like. In exemplary embodiments, operation 204 may set the second modulator control information to select a symbol rate selected from 256 K to 24 Msps, 24 Msps or higher, or the like. In exemplary embodiments, the second modulator control information may include control information for radio components, such as, an amplifier, an up converter, a BIAS control and the like.

The method 200 may include operation 206 for modulating data including the second modulator control information with the first modulator control information to generate a first signal. The first signal may be sent or conveyed to the ODU via an IFL. In exemplary embodiments, the first signal can utilize a burst format, for example, the burst format 610 illustrated in FIG. 6.

The method 200 may include operation 208 for receiving the first signal from IDU at an ODU via the IFL.

The method 200 may include operation 210 for demodulating the first signal in the ODU to obtain, retrieve or extract the data modulated at operation 204.

The method 200 may include operation 212 for retrieving the second transmission modulator control information from the demodulated first signal. In exemplary embodiments, the second transmission modulator control information may be signal included as a payload of the first signal, for example, payload 614 of FIG. 6.

The method 200 may include operation 214 for configuring the ODU modulator using the second transmission modulator control information 214. For example, the ODU modulator is illustrated as modulator 487 in FIG. 4A and as modulator 464 in FIG. 4B.

Figure 4A:
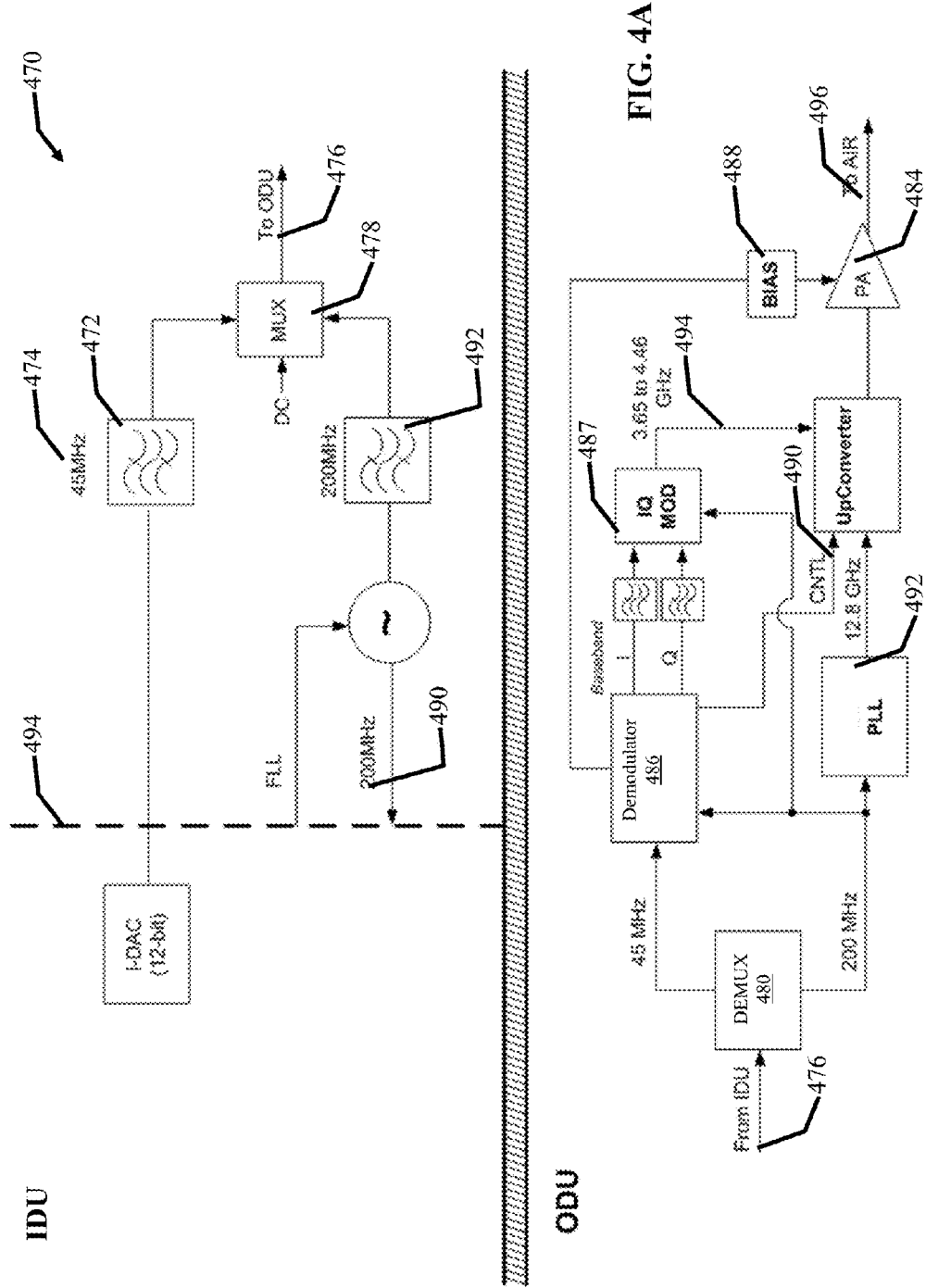
FIG. 4A illustrates an exemplary communication system according to various embodiments.
Figure 4B:
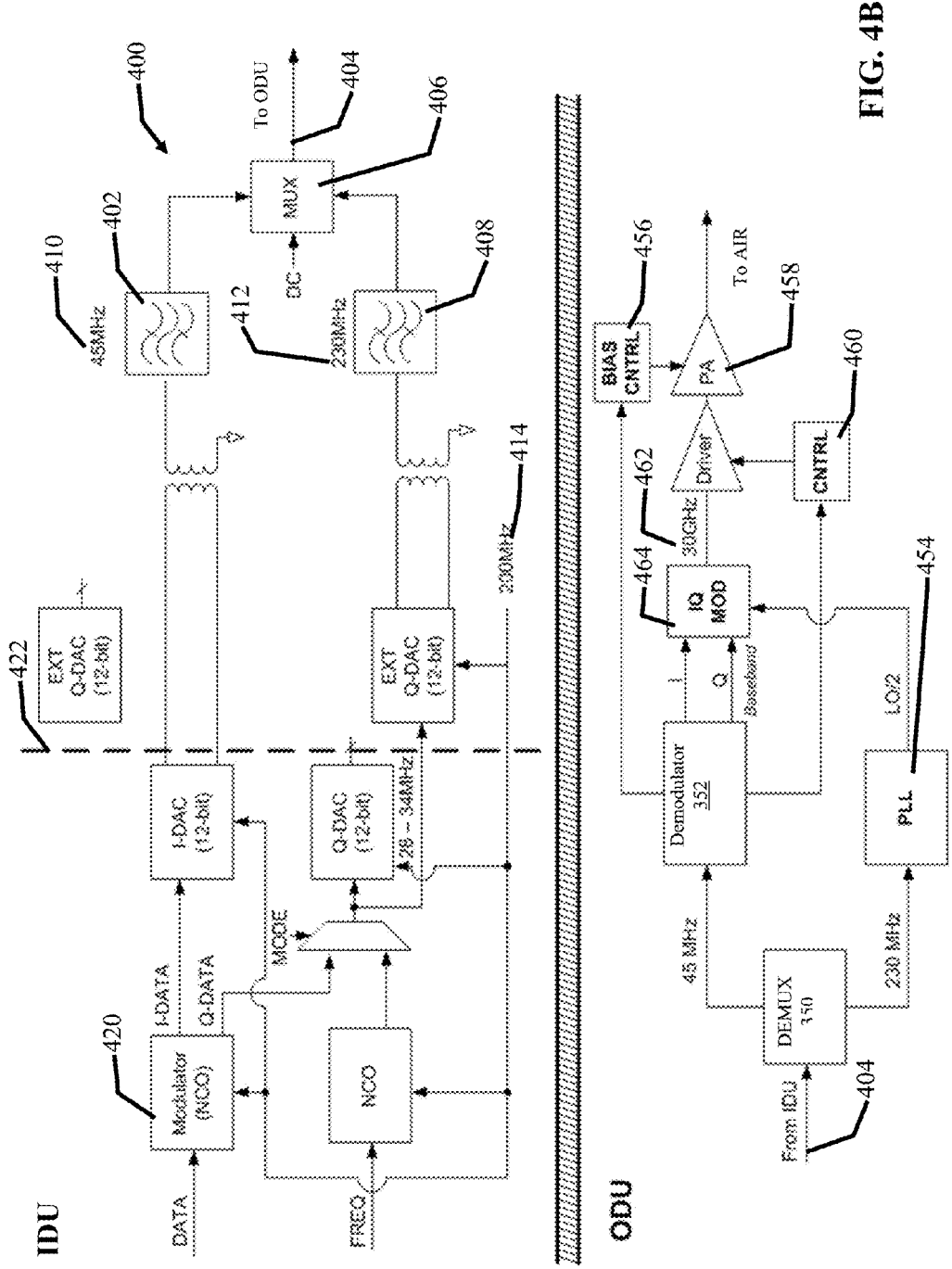
FIG. 4B illustrates an exemplary communication system according to various embodiments.

The method 200 may include operation 216 for modulating a portion of the data to generate a second signal based-on the second modulator control information with the ODU modulator. For example, the second signal may use a carrier frequency from 3.65 GHz to 4.46 GHz as illustrated in FIG. 4A, or a carrier frequency of 30 GHz as illustrated in FIG. 4B.

The method 200 may include optionally operation 218 for up converting the second signal to a third signal. In exemplary embodiments, when up converting is optional, the second signal is the third signal.

The method 200 may include operation 220 for amplifying the third signal.

The method 200 may include operation 208 for transmitting the amplified third signal.

Figure 3:
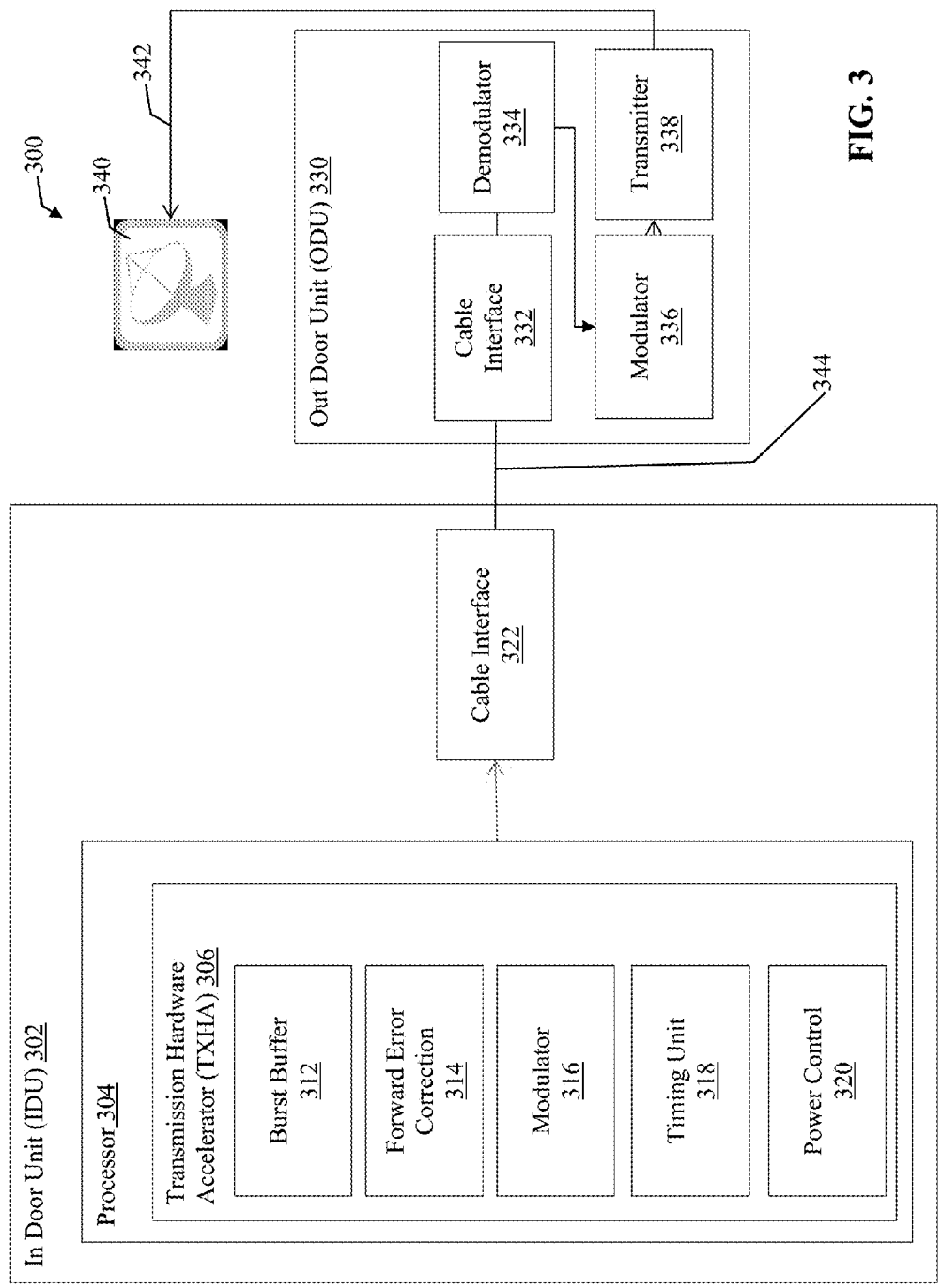
FIG. 3 illustrates a logical view of a communication system according to various embodiments.

FIG. 3 illustrates a logical view of a communication system according to various embodiments. A communication system 300 may be distributed between an In-Door Unit (IDU) 302, an Out-Door Unit (ODU) 330 and connected via an inter-facility link (IFL) 344. The communication may system 300 may be used to provide radio communication at the satellite terminal 115. In exemplary embodiments, the communication system 300 provides a linear radio communication between the IDU and the satellite.

The IDU 302 may include a processor 302 that may be implemented as a programmable processing device, an Application Specific Integrated Circuit (ASIC), or the like. The processor 304 may include a hardware accelerator 306 including a burst buffer unit 312, a forward error correction unit 314, a modulator 316, a timing unit 318 and a power control unit 320. In exemplary embodiments, the IDU includes a cable interface 322 to transmit a signal (multiplexed signal including a modulated signal and a clock/oscillator signal) generated by the processor 304 using, for example, the modulator 316. In exemplary embodiments, the processor 304 may transmit using a single modulation scheme and symbol rate, for example, a 16 APSK scheme at 24 Mega Symbols per Second (Msps) modulated using a first frequency carrier. In exemplary embodiments, the first frequency carrier may be a low frequency carrier, for example, a 45 MHz carrier signal, that is modulated with information to be transmitted. The cable interface 322 may include a cable connector, a signal multiplexor/de-multiplexor, an amplifier, a filter, a splitter and the like. The cable interface 322 may multiplex by placing a DC power voltage, a modulated signal from the processor, an oscillator signal, and the like on the IFL 344 for use by the ODU; the cable interface 322 may separate a received signal received from the satellite by the ODU, and convey the received signal for additional processing. The power control 320 may control an amplifier (not shown) in the ODU 330.

The ODU 330 may include a cable interface 332, a demodulator 334, a modulator 336 and a transmitter 338. In exemplary embodiments, the cable interface 332 includes a cable connector, a signal multiplexor/de-multiplexor, an amplifier, a filter, a splitter and the like. The cable interface 333 may de-multiplex or separate a DC power voltage, a modulated signal from the processor, an oscillator signal, and the like available on the IFL 344 for use by the ODU; the cable interface 332 may place a received signal received from the satellite by the ODU, and convey the received signal for additional processing to the IDU. The demodulator 334 may generate information that includes modulator control information and data for transmission via an antenna 340. The demodulated data is then processed by the modulator 336, and modulated at a higher frequency using the received modulator control information. In exemplary embodiments, the higher frequency may be a frequency used for transmission to the satellite. In exemplary embodiments, the higher frequency may be an intermediate frequency that is up-converted to the transmission frequency prior to transmission to the satellite. The ODU 340 may be connected to an antenna 340 via a cable 342.

The modulator control information may include a modulation scheme, a symbol rate, a burst format and satellite transmission frequency. In exemplary embodiments, the modulator control information for the modulator 336 is provided by the IDU. For example, the IDU may set the modulation scheme as OQPSK, 8 PSK, 16 APSK, or the like. In exemplary embodiments, the symbol rate may be set from 256 K to 24 Msps, 24 Msps or higher, or the like. In exemplary embodiments, the modulator control information may be used to control and configure a linear radio, for example, a TDMA radio.

Exemplary Embodiment

FIG. 4A illustrates an exemplary communication system according to various embodiments. A communication system 470 may be distributed between an IDU and an ODU. In the IDU, a modulator 420 may generate a modulated or information signal based on data to be transmitted. In exemplary embodiments, the information signal may include modulator control information (not shown) to control components disposed at the ODU. The modulator control information may supplement or be in addition to the data to be transmitted. The modulating or information signal may then be modulated at a carrier 474, for example, 45 MHz, to generate a modulated signal 472. An oscillator signal 491, used to generate a satellite transmission carrier, may be transmitted over the IFL 476. In exemplary embodiments, the oscillator signal 492 may be 200 MHz and the satellite transmission carrier 462 may be 12.8 GHz. The satellite transmission carrier may be a multiple of the oscillator frequency 492. A multiplexor 478 may combine a DC voltage, the modulated signal 472 and the oscillator signal 492 to generate a multiplexed signal for transmission to the ODU via an IFL 476. In exemplary embodiments, a logical line 494 separates components of the communication system 470 that may be implemented in a single ASIC or a processor (to the left of the line) from the remaining components needed at the IDU to form the communication system 470.

In the ODU, the multiplexed signal is received from the IDU via the IFL 476. A de-multiplexor 480 may separate the DC voltage (not shown), the modulated signal 472 and the oscillator signal 492. The modulated signal 472 is demodulated by a demodulator 486. The demodulator 486 may retrieve or extract, and optionally remove, the modulator control information intended for the components of the ODU that is embedded in the modulated signal 472. The control information may set a modulation scheme, a symbol rate, a burst structure, a bias control 488, a driver control 490 and the like. The information signal from the demodulator 486 is then modulated with the satellite transmission carrier using modulator 487 to form the satellite transmission signal 462. The encoded oscillator signal 408 is processed by a phase lock look 482, forms the basis of the satellite transmission carrier and is utilized by modulator 487 to generate a third signal 494 having a range of, for example, 3.65 GHz to 4.46 GHz. The third signal 494 may be up-converted and amplified with an amplifier 484 to generate a satellite transmission signal 496. The modulator 487 may use a modulation scheme, a modulation speed, a transmission frequency and the like as set by the modulator control information. The amplifier 484 may be controlled with the bias control 488 and the driver control 490 signals.

FIG. 5 illustrates an exemplary frequency distribution of signals used by a communication system and concurrently placed on an inter-facilities link according to various embodiments.

The communication system 470 of FIG. 4A concurrently places different signals at different carrier frequencies on an inter-facilities link. A modulated signal 502 encoded with information may use a first frequency of 45 MHz, an oscillator signal 510 may use a second frequency of 200 MHz, and a received signal band 520 may range in frequency from 950 MHz to 1450 MHz. The modulated signal 502 and the oscillator signal 510 may form a multiplexed signal. In some embodiments, the multiplexed signal may include the received signal band 520. In some embodiments, the multiplexed signal may include a DC (0 MHz) signal or voltage (not shown). When the modulated signal 502 is encoded at 24 Msps, the modulated signal 502 uses a 24 MHz frequency band ranging, for example, from 33 MHz to 57 MHz. The fourth harmonic frequency band 504 of the modulated signal 502 is centered at 180 MHz and the fifth harmonic frequency 506 of the modulated signal is centered at 225 MHz. Moreover, a third harmonic frequency band (not shown) of the modulated signal 502 is centered at 135 MHz. As such, interference between the modulated signal 502, the third harmonic frequency band, and the fourth harmonic frequency band 504, the fifth harmonic frequency 506, an oscillator signal 510 and a received signal band 520 is minimized, and the signals are separated by large frequency gaps. The gaps permit easy separation of the various signals when a single physical medium, for example, the IFL, communicates the various signals by using, for example, a de-multiplexor.

Exemplary Embodiment

FIG. 4B illustrates an exemplary communication system according to various embodiments. A communication system 400 may be distributed between an IDU and an ODU. In the IDU, a modulator 420 may generate a modulated or information signal based on data to be transmitted. In exemplary embodiments, the information signal may include modulator control information (not shown) to control components disposed at the ODU. The modulator control information may supplement the data to be transmitted. The modulating or information signal may then be modulated at a carrier 410, for example, 45 MHz, to generate a modulated signal 402. An oscillator signal 414, used to generate a satellite transmission carrier 462, may be encoded with a second carrier 412 to generate an encoded oscillator signal 408. In exemplary embodiments, the oscillator signal 414 may be 200 MHz, the second frequency 412 may be 230 MHz and the satellite transmission carrier 462 may be 30 GHz. The satellite transmission carrier 462 may be a multiple of the oscillator frequency 414. A multiplexor 406 may combine a DC voltage, the modulated signal 402 and the encoded oscillator signal 408 to generate a multiplexed signal for transmission to the ODU via an IFL 404. In exemplary embodiments, a logical line 422 separates components of the communication system 400 that may be implemented in a single ASIC or a processor (to the left of the line) from the remaining components needed at the IDU to form the communication system 400.

In the ODU, the multiplexed signal is received from the IDU via the IFL 404. A de-multiplexor 450 may separate the DC voltage (not shown), the modulated signal 402 and the encoded oscillator signal 408. The modulated signal 402 is demodulated by a demodulator 452. The demodulator 452 may extract or retrieve, and optionally remove, the modulator control information intended for the components of the ODU that is embedded in the modulated signal 402. The modulator control information may set a modulation scheme, a symbol rate, a burst structure, a bias control 456, a driver control 460 and the like. The information signal from the demodulator 452 is then modulated with the satellite transmission carrier using modulator 464 to form the satellite transmission signal 462. The encoded oscillator signal 408 is processed by a phase lock look 454, forms the basis of the satellite transmission carrier and is utilized by modulator 464 to generate the satellite transmission signal 462. The modulator 464 may use a modulation scheme, a modulation speed, a transmission frequency and the like as set by the modulator control information. The satellite transmission signal 462 is then amplified with an amplifier 458 prior to transmission via air to a satellite. The amplifier 458 may be controlled with the bias control 456 and the driver control 460 signals.

FIG. 6 illustrates a first exemplary signal structure or burst format for transmitting data or information from the IDU to the ODU, and a second exemplary signal structure or burst format for transmitting data or information from the ODU to the satellite, according to various embodiments.

In exemplary embodiments, packet transfer is based on time slots 602. A first burst format 610 may be utilized to transfer data or information from the IDU to the ODU. The first burst format 610 may be a fixed format. Advantages of utilizing a fixed format include low or zero ramp time, a burst timing set at the last symbol of a unique word (UW), assumption of a fixed delay thru the ODU, and demodulation and modulation for all symbol rates ensuring proper timing. Additionally, first burst format 610 may provide a programmable burst information size, a default required for possible initialization changes and usable to write registers in demodulator and modulator in the ODU. The first burst format 610 may include a unique word 612, burst information 614 and a payload 616.

Examples of burst throughput when data is encoded using a 16 APSK scheme at 24.576 Msps are outlined in the table below.

| Burst (slots) | Overhead (slots) | Info Bits/Burst | Burst/Frame | Bits/Frame | Mbps |
|---|---|---|---|---|---|
| 3 | 9 | 1296 | 768 | 995328 | 22.12E+6 |
| 6 | 9 | 2592 | 614 | 1591488 | 35.37E+6 |
| 24 | 9 | 10368 | 279 | 2892672 | 64.28E+6 |
| 36 | 9 | 15552 | 204 | 3172608 | 70.50E+6 |
| 48 | 9 | 20736 | 161 | 3338496 | 74.19E+6 |
| 52 | 9 | 22464 | 151 | 3392064 | 75.38E+6 |

As noted a max throughput at 4 bits/sym*24.576M=98.304 Mbps may be achieved using 9216 Slots per Frame and a 6 Slot Burst. A 6 slot burst may have 9 Overhead Slots @ 24M, 16 APSK. Current maximum satellite communications use a 24 slot bursts. As the number of slots used in a burst grows, the communication link uses less overhead and provides higher throughput.

A second burst format 620 may be utilized to transfer data or information from the ODU to the satellite. The second burst format 620 may be fixed format or variable. The second burst format 620 may include a ramp time 622, a unique word preamble 624, a payload 626 and a unique word post 628. The receipt of the unique word 612 in a packet of the first burst format 610 may start a timer $\Delta t_1$ 630 that establishes a start of burst time for initiating transmission of a packet in the second burst format 620.

FIG. 7 illustrates an exemplary modulator control information or burst packet header according to various embodiments. burst header fields may be defined as follows:

| Variable | Bits | Notes |
|---|---|---|
| Burst Info Size in Bits | 8 | 256 bits maximum |
| Symbol Rate | 8 | MSb is RATE_CHANGE, then 128 symbol rates |
| Burst Code | 8 | 256 different burst codes possible |
| Payload Size in Symbols | 16 | 65K Payload symbols max |
| Inverse Sync Gain | 8 | Gain Stage for Mod output |
| SCMA Jitter | 16 | MSb is SCMA Mode bit, Common Slot Jitter for SCMA Burst (0 to 4.882 usec) |
| TX Power | 16 | Transmit Power |
| Register Address | 16 | MSb is R/W, time to apply and 14 actual address bits (16K double word addressing) |
| Register Data | 32 | Data to be written |
| Code Block Size | 16 | CB_SIZE[5:0], CB_SHORT[4:0], CB_LONG[4:0] |
| Encoded Payload Size | 16 | Number of bits needed for FEC |
| Spare (FEC + MOD Bypass) | 16 | Code Block Size (in slots) |
| Spare (FEC + MOD Bypass) | 16 | Encoded Payload Size (in bits) |
| Spare | 16 | |
| Spare | 16 | |
| Spare | 16 | |
| Spare | 16 | |
| TOTAL BITS USED | 160 | |
| SPARE BITS | 96 | |

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim:

1. An apparatus for communicating with a radio disposed in an outdoor unit, the apparatus comprising:
   a de-multiplexor configured to separate a multiplexed signal received on an inter-facility link (IFL) into a first signal;
   a demodulator configured to demodulate the first signal based on a first modulator control information to obtain data;
   a modulator configured to modulate a portion of the data based on a second modulator control information to generate a second signal; and
   an amplifier configured to amplify a transmission signal prior to transmission of the transmission signal with an antenna,
   wherein the transmission signal is based on the second signal, the second modulator control information is received by the de-multiplexor and the second modulator control information controls the modulation scheme used by the modulator.

2. The apparatus of claim 1, further comprising a multiplexor configured to add a third signal based on a signal received from the antenna to the multiplexed signal communicated via the IFL.

3. The apparatus of claim 1, further comprising a phase-lock loop (PLL) configured to synchronize a clock based on an oscillator frequency received over the IFL;
   wherein the first signal is modulated at a first frequency greater than 10 MHz, and the first frequency is less than the oscillator frequency, and the oscillator frequency is selected as one of less than or equal to 500 MHz, less than or equal to 400 MHz, less than or equal to 300 MHz, less than or equal to 230 MHz, less than or equal to 200 MHz, less than or equal to 150 MHz, less than or equal to 100 MHz, or the like.

4. The apparatus of claim 3, wherein the oscillator frequency is variable and the transmission signal uses a carrier frequency that is a multiple of the oscillator frequency.

5. The apparatus of claim 3, wherein the oscillator frequency is greater than a third harmonic frequency of the first frequency.

6. The apparatus of claim 1, further comprising an up-converter disposed between the second signal and the transmission signal.

7. The apparatus of claim 1, wherein the data comprises the second modulator control information for the modulator.

8. The apparatus of claim 1, wherein the second modulator control information controls a modulation scheme used by the modulator.

9. The apparatus of claim 1, wherein a modulation scheme requested by the first modulator control information is different than a modulation scheme requested by the second modulator control information.

10. A communication system comprising:
    an In-Door Unit (IDU) modulator configured to generate a first signal at a first carrier frequency by modulating data based on a first modulator control information;
    a multiplexor configured to generate a multiplexed signal comprising the first signal;
    an Inter-Facility Link (IFL) to communicate the multiplexed signal; and
    a remote apparatus configured to receive the multiplexed signal via the IFL, the remote apparatus comprising:
    a de-multiplexor configured to separate the first signal from the multiplexed signal,
    a demodulator configured to demodulate the first signal based on the first modulator control information to obtain data,
    a modulator configured to modulate a portion of the data based on a second modulator control information to generate a second signal, and
    an amplifier configured to amplify a transmission signal prior to transmission of the transmission signal with an antenna,
    wherein the transmission signal is based on the second signal, the second modulator control information is received by the de-multiplexor and the second modulator control information controls the modulation scheme used by the modulator.

11. The system of claim 10, wherein the remote apparatus comprises a multiplexor configured to add a third signal based on a signal received from the antenna to the multiplexed signal communicated via the IFL.

12. The system of claim 10, wherein the remote apparatus comprises
    a phase-lock loop (PLL) configured to synchronize a clock based on an oscillator frequency received over the IFL;
    wherein the first signal is modulated at a first frequency greater than 10 MHz, and the first frequency is less than the oscillator frequency, and the oscillator frequency is selected as one of less than or equal to 500 MHz, less than or equal to 400 MHz, less than or equal to 300 MHz, less than or equal to 230 MHz, less than or equal to 200 MHz, less than or equal to 150 MHz, less than or equal to 100 MHz, or the like.

13. The system of claim 12, wherein the oscillator frequency is variable and the transmission signal uses a carrier frequency that is a multiple of the oscillator frequency.

14. The system of claim 12, wherein the oscillator frequency is greater than a third harmonic frequency of the first frequency.

15. The system of claim 10, wherein the remote apparatus comprises an up-converter disposed between the second signal and the transmission signal.

16. The system of claim 10, wherein the data comprises the second modulator control information for the modulator.

17. The system of claim 10, wherein the second modulator control information controls a modulation scheme used by the modulator.

18. The system of claim 10, wherein a modulation scheme requested by the first modulator control information is different than a modulation scheme requested by the second modulator control information.

19. A method for communicating data over an inter-facility link (IFL) between an indoor unit (IDU) and a radio disposed in an outdoor unit (ODU), the method comprising:
    establishing a first modulator control information;
    establishing a second modulator control information;
    modulating, with an IDU modulator, the data comprising the established second modulator control information based on the established first modulator control information to generate a first signal;
    receiving the first signal from the IDU at the ODU with the IFL;

demodulating the received first signal in the ODU to obtain the data;

retrieving the second modulator control information from the demodulated first signal;

configuring an ODU modulator using the retrieved second modulator control information;

modulating, with the ODU modulator, a portion of the data to generate a second signal based on the retrieved second modulator control information; and transmitting a third signal based on the second signal, wherein a modulation scheme requested by the first modulator control information is different than a modulation scheme requested by the second modulator control information.

20. The method of claim 19, wherein the data comprises the second modulator control information.

21. The method of claim 19, wherein the first modulator control information controls a modulation scheme used by the IDU modulator and the second modulator control information controls a modulation scheme used by the ODU modulator.

22. The method of claim 19, wherein a modulation data rate requested by the first modulator control information is different than a modulation data rate requested by the second modulator control information.

23. The method of claim 19, wherein the modulating of the data by the ODU modulator overlaps in time with the receiving of the first signal from the IDU.

\* \* \* \* \*